United States Patent [19]

Arai

[11] 4,012,755
[45] Mar. 15, 1977

[54] ELECTRICAL FILM REWINDING DEVICE

[75] Inventor: Akihiro Arai, Tokyo, Japan

[73] Assignee: Asahi Kogaku Kogyo Kabushiki Kaisha, Tokyo, Japan

[22] Filed: June 2, 1975

[21] Appl. No.: 583,030

[30] Foreign Application Priority Data

June 5, 1974 Japan .............................. 49-63687

[52] U.S. Cl. .............................. 354/214; 354/173
[51] Int. Cl.² ......................................... G03B 1/00
[58] Field of Search .......... 354/214, 170, 171, 172, 354/173

[56] References Cited
UNITED STATES PATENTS

| 3,598,033 | 8/1971 | Sasaki | 354/214 |
| 3,735,683 | 5/1973 | Umeda | 354/173 X |

Primary Examiner—Edna M. O'Connor
Attorney, Agent, or Firm—Sughrue, Rothwell, Mion, Zinn & Macpeak

[57] ABSTRACT

An electric motor within a film rewinding device is connected by a gear reduction unit to an axially shiftable clutch to a rewind drive shaft which shaft projects axially to achieve clutching and to effect drive connection with a film support reel within a camera. A rotatable rewind operating lever within the rewind device is normally maintained in drive shaft de-clutch and reel disengagement position but is rotatable to effect clutching and drive engagement with the reel after moving through a position in which a driven element engages the film take up release member within the camera to release the film for rewind. The rewind operating lever further rotates to a position closing mutually open switch contacts controlling energization of the shaft drive motor.

7 Claims, 6 Drawing Figures

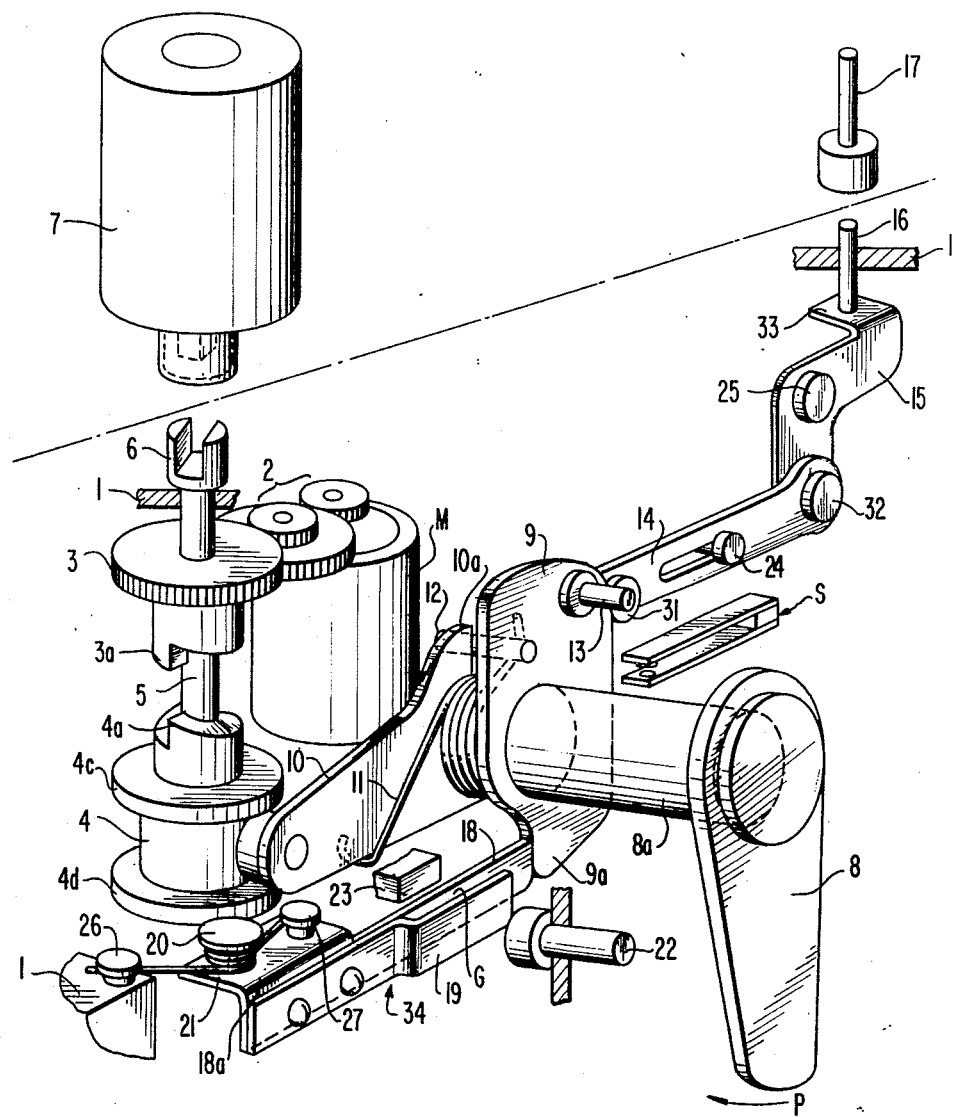
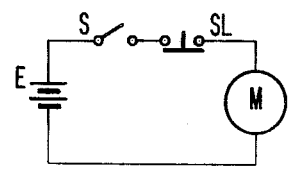
FIG.1
FIG.6

ELECTRICAL FILM REWINDING DEVICE

BACKGROUND OF THE INVENTION

1. Field of the Invention

The present invention relates to a device for automatically electrically rewinding a film within a camera.

2. Description of the Prior Art

Generally stated, in cameras the rewinding of the film must be done after a film reverse direction prevention device has been released. In a camera where the rewinding device is detachable from the camera, if rewinding operation is carried out where connections between the rewinding device and the camera are not completely achieved, damage is likely to occur to the connections, to the device, or to the camera, and therefore it is necessary to insure that rewinding occurs only after the mechanical connections have been completely assured between the device which carries the motor for positively rewinding the film and the film support spool or other element within the camera upon which the film is rewound.

A number of cameras have heretofore been proposed in which the film take up release member carried by the camera is operated not only to release the film for rewind, but also to permit the taking of multiple exposures of the film. However, in those cases where arrangements are provided to permit both multiple exposure of the film and rewinding by means of a single lever, accidental multiple exposure of the film may occur or inadvertent rewinding, and hence when multiple exposure is desired, obviously, inadvertent rewinding of the film should be avoided. This requires a locking device to insure that when the film take up release member is released to permit multiple film exposure, an interlock prevents the inadvertent powered rewinding of the film.

Further, measures should be taken to avoid unnecessary excessive driving or rotation of the film take up means upon completion of film rewinding, or avoid the misconception that rewinding has been completed when in fact the film is not completely rewound.

It is, therefore, an object of the present invention to provide a device for electrically automatically rewinding of film in a camera which has an automatic stopping function upon termination of rewinding and wherein in carrying out the series of operations of rewinding the film, malfunction of the rewinding apparatus and erroneous operation can be avoided with a minimum complexity of operating members and by way of a simple mechanism, and wherein both multiple exposure and manual rewinding operation may also be readily effected.

The present invention therefore functions to provide, in order to solve the deficiencies as noted above, a simple device for electrically rewinding a film within a camera which device has accurate and simple operability and which is provided with a regulatory mechanism operating relative to a series of operations to avoid malfunction, misconception in terms of operation completeness, and the like.

SUMMARY OF THE INVENTION

The electrically driven film rewinding device for detachable engagement with a camera mechanism of the present invention carries within a device body, a rewind drive shaft which is axially movable within said body from a depressed, nonengaged to an extended, engaged position relative to a rotatable film reel or spool within the camera upon which the film is rewound during rotation of the connection shaft. The camera further carries a displaceable film take up release member which is displaceable from a film lock position to a film release position permitting the spool to take up the film. An electric motor mounted within the device body is coupled by a gear reduction unit to a driver gear rotatably mounted on the spool connection shaft forming a first clutch element engageable with a second clutch element fixed to said shaft and movable axially therewith to effect positive rotation of the connection shaft upon axial shifting to reel engaged position. A rewind operating lever is mounted to a rotatable operating shaft mounted on the device body for rotation about its axis. A clutch actuation and rewind shaft engaging lever is resiliently coupled to the rewind operating shaft and rotatable therewith. The rewind operating lever is rotatable from a position where the rewind drive shaft is uncoupled from the reel, the clutch is disengaged to a position where the clutch is engaged and the rewind shaft is engaged with the reel. A switch is mounted within the body adjacent to the edge of a cam plate fixed to the operating shaft and is rotatable therewith to close normally open switch contacts for energizing the drive motor when the rewind operating lever rotates its full extent.

The device further includes interlock means responsive to rotation of the rewind operating lever an initial predetermined extent to move the film take up release member from film locking position to film release position to permit multiple exposure of the film prior to the clutch operating lever having moved to a position engaging the clutch and effecting connection between the rewind drive shaft and the reel.

The cam plate fixed to the operating shaft is rotatable into contact with one end of a rod mounted on said body for reciprocation, the other end of said rod is pivotably coupled to one end of a crank mounted for rotation on said body and supporting an axially shiftable rewind device film release pin which is projectable into contact with said film take up release member within said camera to release the same.

The rotatable cam plate is operatively positioned with respect to the normally open switch contacts and carries a fixed switch pin which upon rotation of the rewind operating lever against the bias of the resilient connection between the clutch actuating and rewind drive shaft engaging lever and the cam plate to close said normally open switch contacts subsequent to release of the film take up release member within said camera, engagement of the clutch and rewind drive shaft engagement with said film support reel.

A locking plate assembly lever is adjustably positioned on the rewind device body and movable relative to said clutch actuating and rewind drive shaft engaging lever and movable between three different positions to prevent rotation of said rewind operating lever from a first position, permit limited rotation of said rewind operating lever support shaft from said first position to a position where said film take up release member within said camera is shifted from locked to released position, and permitting rotation of said rewind operating lever from said first position to a position where clutch engagement, and engagement of the rewind drive shaft with said film support reel occurs and, to a final position where closure of the switch contacts acts to energize the drive motor effecting film rewind.

The locking plate assembly is an assembly pivotably mounted to one side of said rewind operating shaft and in general alignment with said cam plate, said locking plate assembly having two laterally spaced elongated locking plates pivotable between extreme positions where the longer length plate abuts an edge of said cam plate to maintain said rewind operating lever in said first position and a position where, the shorter plate abuts that edge of said cam plate to limit rewind operating lever movement to a position where said film take up release member is released. An intermediate position aligned with the gap between the locking plates allows said rewind operating lever to rotate through a position where said clutch is engaged and said rewind drive shaft engages said film support reel to a final position where said normally open switch contacts are closed. Preferably, said pivotable assembly is spring biased to a position where said long length plate abuts the edge of said cam plate and said rewind device body further comprises an axially displaceable lock releasing member or button mounted on said body for moving into contact with said lock releasing member to shift said locking plate assembly to said alternate positions.

BRIEF DESCRIPTION OF THE DRAWINGS

FIG. 1 is a perspective fragmentary view of the principal components of the electrically driven film rewinding device of the present invention as positioned relative to film rewind control elements of a camera with which the device is employed.

FIG. 6 is an electric circuit diagram of the electric film rewinding device of the present invention.

DESCRIPTION OF THE PREFERRED EMBODIMENT

Figure 2:
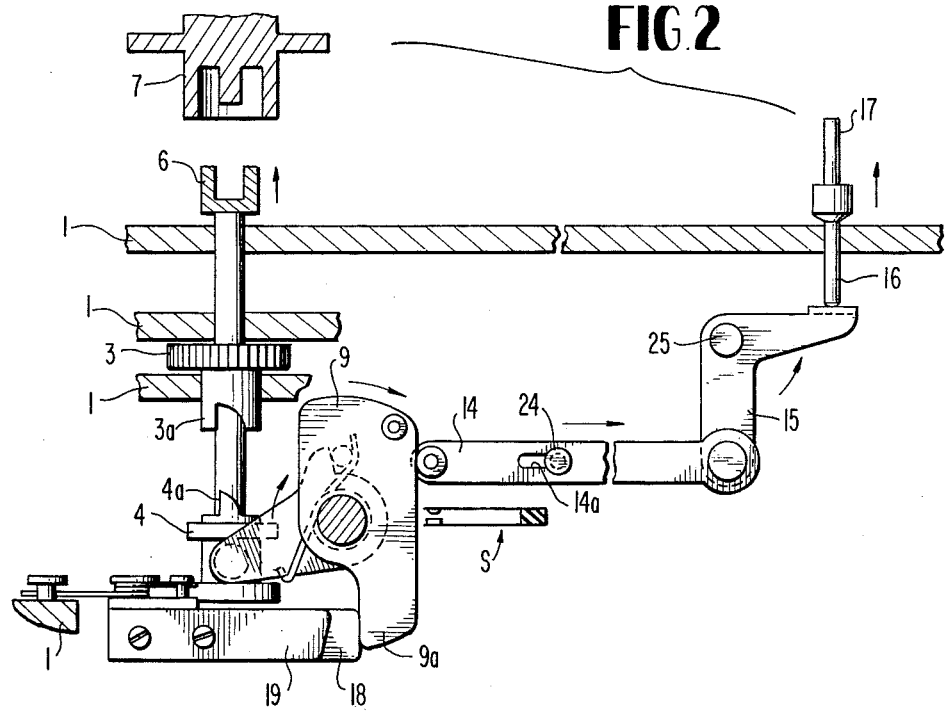
FIG. 2 is a sectional, elevational view of the device shown in FIG. 1 in a film locked state.

A preferred embodiment of the present invention will now be described with reference to the accompanying drawings. In the figures, a normally open switch S is mounted within the rewinding device body 1 and electrically connected between an electric rewind drive motor M and an electrical power source E, the motor M being energized to effect rewinding by closing of the switch contacts of switch S. The motor M is fixedly mounted with body 1 of the device, and the driving force of the motor M is transmitted to a rewind shaft driving gear 3 through a gear reduction system 2. The end of the stem 3a of gear 3 forms one clutch element and is mounted within body 1 for operative engagement with an end of stem 4a, forming a second clutch element of a disengageable clutch ring 4. A rewind drive shaft 5 is mounted within aligned opening 1a and 1b of the body 1, for a limited axial movement and terminates at its upper end in a rewind joint or connector 6 which is projected and retracted relative to the body 1 for engagement and disengagement with a film wind up reel or spool 7 mounted for rotation within a camera (not shown). The shaft 5 has fixedly secured at its lower end the disengageable clutch ring 4, while the shaft driving gear 3 is rotatably mounted on the shaft 5 but prevented from shifting axially by body 1.

From the above arrangement, it may be seen that when the disengageable ring 4 is slid axially upward, moving with shaft 5, it causes engagement of the clutch elements 3a and 4a, and upon energization of the motor M, the shaft 5 is rotated about its axis and since it has axially shifted to the point where the rewind joint or connector 6 is coupled to the film spool 7, by being received within the recessed end portion 7a of that spool, as a result, the driving force of the motor M effects rewinding of the film (not shown) carried by the reel 7.

Further, the body 1 rotatably mounts an operating shaft shaft 8a for rotation about its axis, which is generally at right angles to the axis of the rewind drive shaft 5, the shaft 8a carrying at one end and fixedly mounted thereto, a rewind operating lever 8 which effects rotation of shaft 8a about its axis. A cam plate 9 is integral with the shaft 8a, intermediate its ends and rotates with the shaft 8a and the rewind operating lever 8. A coil spring 11 loosely carried by shaft 8a is retained at one end by the cam plate 9 and cam plate pin or stopper 12 and the other end by lever 10. This causes the lever 10 to rotate coaxially with the rewind operating lever 8. The clutch operating and rewind shaft engaging lever 10 has one end 10a spring biased against pin 12 which is fixedly mounted to the cam plate 9 radially outward of the axis of the support shaft 8a. Accordingly, when the rewind operating lever 8 is rotated clockwise as indicated by the arrow P in FIG. 1, the clutch operating and rewind shaft engaging lever 10 rotates therewith under the resilient connection provided by spring 11, one end of which engages lever 10 and the other end of which engaged pin 12 fixed to the cam plate 9.

A clutch operating pin 29 is fixed to the other end 10b of the clutch operating and rewind shaft engaging lever 10 and lies between flanges 4c and 4d of ring 4 such that when the rewind operating lever 8 is rotated clockwise, the disengageable clutch ring 4 moves axially upwards to effect clutch engagement by the clutch faces on the opposed ends of clutch elements 3a and 4a.

As the rewind operating lever is further rotated clockwise further rotation of the clutch operating and rewind shaft engaging lever 10 is prevented because the driving gear 3 will not shift axially, and continued movement of cam plate 9 and the stopper 12 causes the additional turning effort to be stored in the spring 11 although the spring resiliently allows continued rotation of the rewind operating lever 8, the operating shaft 8a and cam plate 9 about the axis of the shaft 8a. Fixed to the opposite side of the cam plate 9 from the stopper 12 is a switch actuator pin 13 which moves against the upper switch contact member to close the normally open switch contacts of switch S to thereby initiate energization of motor M as may be seen by reference to FIG. 6. An axially shiftable rod 14 is mounted within the body 1 for limited axial shifting by means of a pin 24 which projects through an elongated slot 14a. The rod 14 carries at the end nearest shaft 8a, a roller 31 which bears on the periphery of the cam plate and the rod 14 acts as a cam follower during rotation of the cam plate 9. During clockwise rotation of the cam plate 9 in following the rewind operating lever 8, the rod 14 moves from left to right. A crank 15 is pivotally mounted to the body 1 by pin 25 and is pinned to the end of the rod 14 opposite roller 31 by pin 32, and rotates counterclockwise to cause a plate portion 33 to lift a rewind device film release pin 16 which, in turn, contacts a film take up release member 17 within the camera and to shift the film take up release member from locked position to released position. This permits the film support reel 7 to take up the film upon engagement of shaft connector 6 with the spool 7, engagement of the clutch element 3a and 4a and energization of the motor M.

Further, the cam plate 9 has an edge opposite that contacting the roller 31 of rod 14 forming a stop portion 9a which selectively locks the cam plate 9 against rotation by first and second locking plates 18 and 19 respectively of a locking plate assembly indicated generally at 34. The locking plate 18 includes a right angle base or arm 18a which supports the assembly for rotation about a common vertical pivot axis as defined by a pivot pin 20 fixedly mounted relative to the rewind device body 1. The plates 18 and 19 are elongated with the plate 18 being of longer length relative to the pivot axis than the plate 19. Plate 19 has its terminal portion remote from the pivot pin 20 laterally offset to form a gap G between the plates facing cam plate 9. Further, a lock releasing member or button 22 is slidably mounted on body 1 at a position to the side of the locking plate assembly 34 such that by shifting the lock releasing member 22 from the right to the left, it may pivot the locking plate assembly 34 counterclockwise about the axis of pin 20. The pin 20 carries a coil spring 21 with opposed ends compressed against a fixed pin 26 mounted to body 1 and a fixed pin 27 projecting upwardly from the arm 18a of the locking plate 18. Under this arrangement, the biasing force of the coil spring 21 tends to rotate the locking plate assembly 34 clockwise to the position where, initially, the end of the longer locking plate 18 abuts the edge of the stopper portion 9a of the cam plate 9. A stop 23 is fixed to the device body 1 to the side of the locking plate assembly 34 opposite the lock releasing member 22 such that when the lock releasing member 22 is depressed, it rotates the locking plate assembly 34 counterclockwise and the locking plate 18 abuts the stop 23 and the edge of the stop portion 9a of the cam plate moves into engagement with the second locking plate 19. The second locking plate 19 stops the cam plate 9 after it has rotated a predetermined angle. When the lock releasing member 22 is released the locking plates 18 and 19 rotate about the pivot axis defined by pin 20 under the force of the coil spring 21 such that it moves clockwise, FIG. 1. At this point, the locking plate 18 contacts the side of the cam plate 9 such that the cam plate 9 is aligned with the gap G between locking plates 18 and 19. The cam plate may then rotate freely. Thus, the sequence of operation is such that, first, the cam plate 9 is locked and the rewind operating lever 8 cannot move from the initial position shown in FIG. 1, secondly, because of the location of stop 23, the cam plates may move to the point where the edge of portion 9a abuts against the edge of the second blocking plate 19, at which point the rewind operating lever is held in the position shown in FIG. 3, and thirdly, upon further release of the lock releasing member 22, the biasing force causes the assembly to rotate clockwise to the extent that the first locking plate 18 abuts against the side of the cam plate portion 9a of the cam plate 9 which is maintained within gap G, the gap being of a lateral dimension on the order of the width of the cam plate 9, and the cam plate 9 is free to rotate dependent upon further rotation of the rewind operating lever 8.

Figure 4:
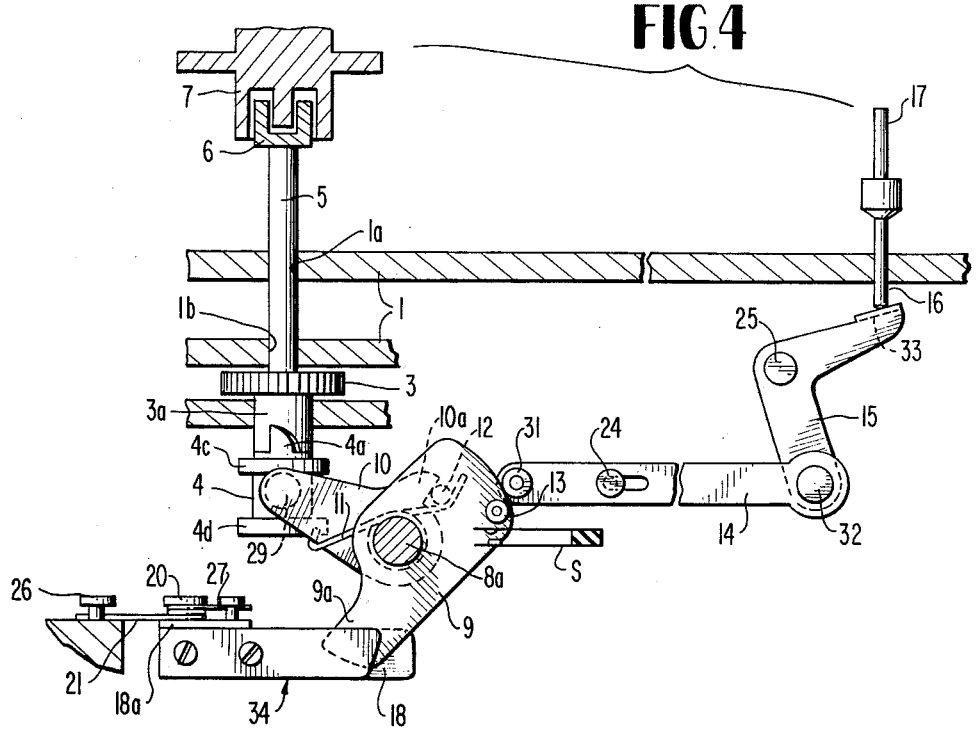
FIG. 4 is a sectional view similar to that of FIGS. 2 and 3 with the device in the state where the clutch is engaged, the rewind drive shaft engages the film spool, and the film take up release member released, but prior to energization of the drive motor.
Figure 5:
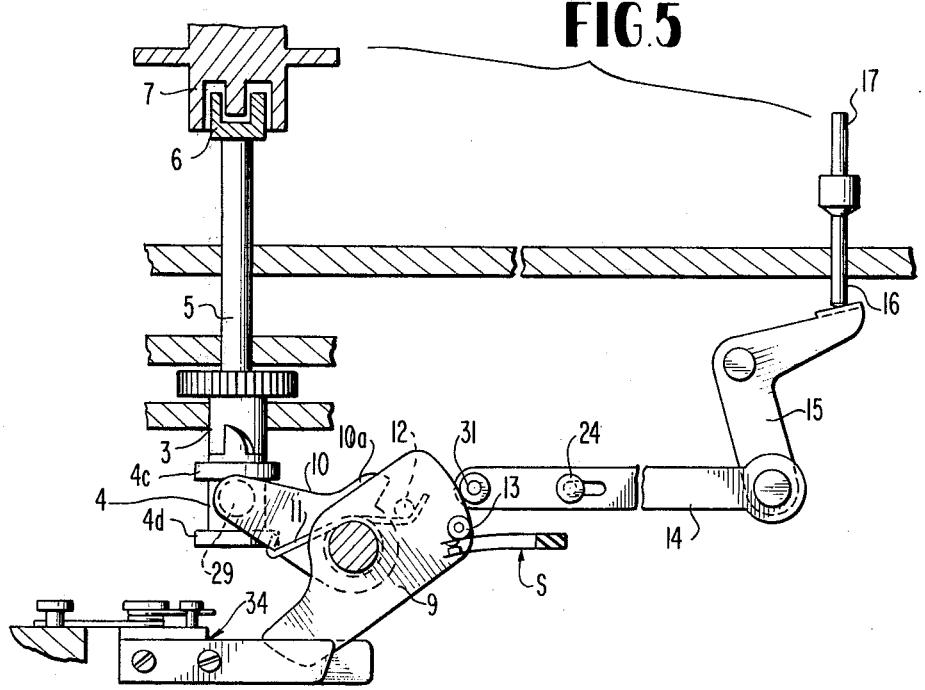
FIG. 5 is a similar sectional view to that of FIGS. 2–4 inclusive with the device in the state of active film rewinding operation.

Further, rotation of this lever 8 may be seen by reference to FIGS. 4 and 5, first to a position shown in FIG. 4 in which clutch engagement occurs between the opposed ends of the clutch elements 3a and 4a and the shaft 5 is axially shifted to effect engagement or coupling between the shaft connector 6 and the film support reel 7, while further rotation of the rewind operating lever 8 against the bias of the resilient spring 11 causes the cam plate 9 to rotate further clockwise to the extent of increasing the tension on spring 11 and displacing the stop or pin 12 away from the rear edge 10a of the clutch operating and rewind shaft engaging lever 10 to the extent where pin 13 carried by cam plate 9 closes the normally open switch contacts of switch 30 causing energization of the drive motor M and rewind of the film on the film support reel 7.

Figure 3:
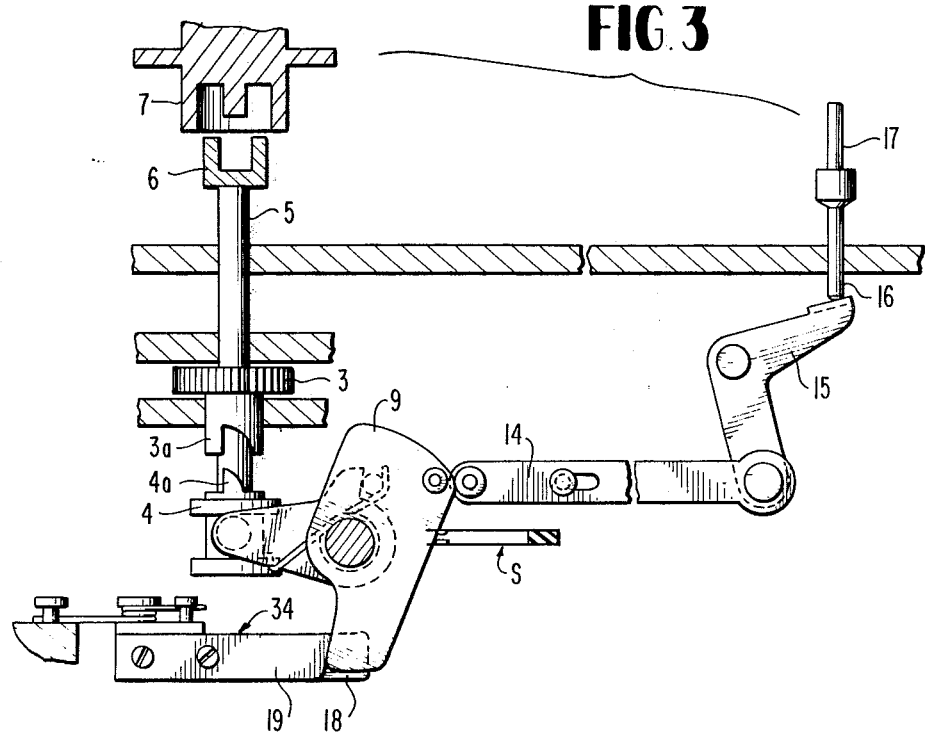
FIG. 3 is a similar sectional view to that of FIG. 2 with a device in the film unlocked state permitting multiple exposures of the film within the camera.

A detailed description of the operation of the device of the present invention will now be described. In cases where multiple exposure of the film is desired without rewinding, the lock releasing button 22 is first fully depressed in order to prevent malfunction and to release the rewind operating lever 8 by disengaging the first locking plate 18 from the edge of portion 9a of cam plate 9. Then, when the rewinding operating lever 8 is rotated in the direction indicated by the arrow P in FIG. 1, the cam plate 9 portion 9a engages the edge of the second locking plate 19 as shown in FIG. 3, thus limiting at that moment further rotation of the rewind operating lever 8. At this time, the cam plate 9 has rotated to the extent that it has shifted the rod 14 from the left to right to cause the crank 15 to rotate sufficiently to lift pin 16 and to unlock or release the film take up release member 17 permitting the film to be released and allowing the desired multiple exposure of the film. The shifting of the film take up releasing member 17 within the camera actuates a known multiple exposure feed stopping device (not shown) to permit multiple exposure of the film to occur. It is to be noted that at this time the rewind switch S has its contacts in the normal open position so that rewinding is prevented, this further being impossible due to the fact that, with the rewind operating lever in this position, locked by the second locking plate 19, the clutch elements 3a and 4a are disengaged and the shaft 5 is retracted and out of engagement with the film support reel 7.

When the rewind operating lever is released, all of the mechanism is returned to its original position by the force of springs (not shown) under conditions as seen in FIG. 2. That is, a return from the conditions seen in FIG. 3. As evidenced in the state shown in FIG. 3, the clutch elements 3a and 4a are disengaged and no connection is achieved between connector 6 and the film spool 7. In this case, however, even if they were connected, rewinding could not be initiated and the film cannot be fed, although the film take up release member 15 is shown as moved to its lifted position. Further, because engagement is not effected between the connector 6 and the reel 7, there is no resistance to the manual operation involved in effecting the desired multiple exposure of the film.

Next, the film rewinding operation is described. In a manner similar to the multiple exposure operation described above, the lock releasing button 22 is depressed to release engagement between the cam plate 9 and the first locking plate 18, so that the rewinding operating lever may be rotated in the direction as indicated by the arrow P in FIG. 1. When the lock releasing button 22 is returned during the time when the cam plate 9 is released from locking plate 18, it is controlled by the second locking plate 19, however, upon the release of the lock releasing member 22, the locking plate 18 moves against the left side of the cam plate 9, FIG. 1, and the cam plate 9 moves between the first locking plate 18 and the second locking plate 19, within gap G. Meanwhile, the film take up release member 17 is shifted to the position shown in FIG. 3 (similar to that occurring during conditioning of the camera for multiple exposure). When the operating lever 8 is now further rotated in the direction P, FIG. 1, the disengageable clutch ring 4 may be moved by the clutch operating and rewind shaft engaging lever 10 vertically upwards to the point where the clutch elements 3a and 4a engage at the same time, the shaft 5 rising and projecting to the extent where the shaft connector 6 engages the film take up reel 7. Meanwhile, the film take up release member 17 is maintained in its raised or film release position by the position of the cam plate 9, this state being illustrated in FIG. 4.

At this point, when the rewind operating lever 8 is further rotated clockwise in the direction P, FIG. 1, after the clutch is engaged, the resistance to axial shifting of the driver gear 3 prevents further rotation of the disengageable clutch ring 4 and the clutch operating and rewind shaft engaging lever 10, but even though the lever 10 remains stationary, rotation of the cam plate is permitted by the spring 11 and the cam plate 9 rotates clockwise to a further extent, FIG. 5, where the pin 12 moves away from the edge 10a of lever 10, the spring 11 being further tensioned and storing the energy required to effect this further rotation of cam plate 9. Pin 13 on the cam plate 9 rotates with the cam plate and closes the normally open switch contacts of switch S to energize the motor M and the film is rewound by positive rotation of the film support reel 7, this state being illustrated in FIG. 5.

The rewind operating lever 8 is provided with a lever control spring (not shown) so that all of the members of the device are returned to the state shown in FIG. 1 upon completion of the operation and the cam plate 9 is automatically locked by the first locking plate 18 to thereby lock the operating lever 8 against further rotation in the absence of depression of the lock releasing member of pin 22.

Further, there is provided an automatic stopping arrangement, wherein an automatically restored frame register or an automatically restored inching mechanism is inched by rotation of the rewind shaft 5, said inching mechanism (not shown) including a limit switch SL, FIG. 6, which is opened by the inching movement at a predetermined time (for example, in the case of a 35 mm 36-frame film, 31 times which corresponds to the number of revolutions required for rewinding about 40 film frames), said switch SL being connected in series with the power source E, motor M and switch S and thereby automatically opening the circuit to the drive motor to discontinue driving of the film rewind support reel 7.

Additionally, a further, simpler automatic stopping arrangement may be designed in which the desired number of revolutions is converted into time from the number of revolutions of the rewind shaft 5 to provide a simple electric timer, thereby extending the set time to such an extent that errors in a number of revolutions of the rewind shaft may be absorbed.

In a device having the rewind being operating lever 8 fixed to lever 10, the clutch elements 3a and 4a will have their crests brought into contact with each other, which causes them to be immovable in the state where they are not engaged. For this reason, the switch S employed to start the motor in its rotation must be closed prior to engagement of the clutch, otherwise, as a result where the clutch elements are brought into engagement with each other after a number of revolutions of the shaft, shock is imparted to the clutch mechanism. In accordance with the present invention, the spring 11 is provided between the operating lever 8 and the clutch operating and rewind shaft engaging lever 10 so that after the opposing faces of the clutch elements 3a and 4a have been pressed together, the switch S is closed to initiate rotation, whereby the clutch elements are brought into engagement before they finish a complete single rotation, thus resulting in minimum shock and an increase in durability, the above contrasting the present invention sharply to the prior art.

Thus, the present invention may provide a device for electrically automatically rewinding of film which device has an automatic stopping function and wherein malfunction and erroneous operation may be avoided with a minimum of operating members and through the use of a simple mechanism and permitting multiple exposure operation and manual rewinding operating operation as desired. According to the present device, accurate film rewinding may be accomplished through a simple operation of the lock releasing button 22 and manual rotation of the rewind operating lever 8.

While the invention has been particularly shown and described with reference to a preferred embodiment thereof, it will be understood by those skilled in the art that various changes in form and details may be made therein without departing from the spirit and scope of the invention.

What is claimed is:

1. An electrically driven film rewinding device for detachable engagement with a camera for effecting film wind up within said camera, said camera carrying a rotatable film support reel upon which film is rewound during rewind device engagement, said device comprising:
   a body,
   a camera film rewind drive shaft rotatably mounted within said body and axially movable between an extend position in engagement with the camera mounted film reel and a retracted, nonengaged position when said rewinding device is attached to said camera,
   a rewind drive shaft drive motor within said body,
   clutch means for operatively connecting said drive motor to said rewind drive shaft for effecting shaft rotation,
   an operating shaft rotatably mounted on said body,
   a rewind operating lever mounted on said operating shaft for rotation about the operating shaft axis,
   a clutch operating and shaft rewind engaging lever resiliently mounted on said operating shaft and rotatable therewith, said rewind operating lever being rotatable from a first position where said shaft is uncoupled from said reel, said motor is disengaged, said clutch means is disengaged, through a second position to a third position wherein said clutch means is in engagement and said rewind drive shaft is projected into coupling relationship with said film support reel, normally open switch means mounted within said body and being closed in response to rotation of said rewind operating lever from said first position to at least said third position for energizing said motor to rewind said film, and wherein said camera includes a displaceable film take up releasing member shiftable from a normally film locked position to a film released position, and said rewinding device further includes mechanical interlock means responsive to rotation of said rewind operating lever from said first position to said second position to shift said film take up release member from locked position to released position prior to said rewind operating lever effecting clutch engagement and rewind drive shaft connection with said film support reel when said rewind device is attached to said camera.

2. The film rewinding device as claimed in claim 1, wherein a cam plate is fixed to said rewind operating shaft for rotation with said rewind operating lever, a control rod is mounted for limited reciprocation adjacent said cam plate with one end in the path of said rotating cam plate, a crank arm is pivotably mounted to said body and is coupled to the end of said rod facing away from said cam plate, an axially displaceable rewind device film release pin is mounted within said device body in contact with said crank arm and movable into engagement with said film take up release member within said camera; whereby, projection of said rewind device film release pin upon rotation of said rewind operating lever from said first to said second position drives said film take up release member to its released position.

3. The device as claimed in claim 2, wherein said cam plate carries a switch actuator pin mounted thereto radially displaced from the axis of rotation of said cam plate and movable about a path which intersects normally open switch contacts of said switch means, and said switch actuator pin is mounted on said cam plate such that rotation of said rewind operating lever from an initial first position through said second and third positions to a fourth position causes said contacts to close subsequent to engagement of said clutch means and axial projection of said rewind drive shaft to effect shaft connection between said rewind drive shaft and said film support reel.

4. The device as claimed in claim 3, wherein clutch operating and rewind shaft engaging lever is pivotably mounted on said operating shaft adjacent said cam plate, a coil spring concentrically surrounds said operating shaft and has its ends abutting said clutch operating and rewind shaft engaging lever and a stop pin fixed to said cam plate to bias said lever to resiliently couple said clutch operating and rewind shaft engaging lever to said cam plate, said rewind drive shaft terminates at its lower end in a double flange clutch ring forming one clutch element of said clutch means, said rewind drive shaft rotatably carrying a driving gear which is restrained from axial movement relative to said rewind drive shaft and has formed on the face facing said flanged clutch ring a second clutch element of said clutch means, and a gear reduction unit forms a gear train between said drive motor and said rewind drive shaft mounted driving gear; whereby, said rewind operating lever in rotating from said first through said second and to said third position, causes the clutch operating and rewind shaft engaging lever which resiliently rotates therewith to axially shift said rewind drive shaft to engage said clutch elements and to cause said rewind drive shaft to operatively engage the film support reel, and wherein further rotation of said rewind operating lever causes said cam plate to rotate relative to said clutch operating and rewind shaft engaging lever against the bias of said spring to close said switch contacts and energize said drive motor.

5. The device as claimed in claim 4, further comprising a locking plate assembly pivotably mounted on said body and rotatable relative to said cam plate such that said locking plate assembly in a first position prevents rotation of said rewind operating lever from its first position, in a second position permits limited rotation of said rewind operating lever from its first position to a second position where said film take up releasing member is shifted to released position, and wherein pivoting of said locking plate assembly to a third position permits rotation of said rewind operating lever from said first position through said second and third positions to said fourth position to effect clutch engagement, rewind drive shaft connection with the film support reel and closure of the switch contacts to energize said drive motor.

6. The device as claimed in claim 5, wherein said locking plate assembly comprises: a pivotable arm mounted for rotation about an axis parallel to the plane of the cam plate, said arm carries two laterally spaced elongated locking plates extending parallel to said cam plate, one of said locking plates being longer than the other such that by rotating said locking plate assembly the ends of said laterally spaced locking plates selectively abut the edge of said cam plate or are positioned on respective sides thereof permitting unrestricted rotation of said rewind operating lever by rotation of the cam plate within the gap between said laterally spaced locking plates.

7. The device as claimed in claim 6, wherein a reciprocating lock releasing button is mounted within said body and to one side of said pivotable locking plate assembly, spring means bias said locking plate assembly into contact with said lock releasing button, a fixed stop mounted to the body on the side of said locking plate assembly opposite that of said lock releasing button to limit pivoting of said locking plate assembly against the bias of said spring to place the edge of said shorter length locking plate against the edge of said cam plate to permit partial rotation of said rewind operating lever from its first position to its second position, and wherein upon subsequent release of said lock releasing button said pivotable locking plate assembly pivots under the bias of said spring to the point where said longer length locking plate presses against the side of the cam plate, placing the cam plate within the gap between said two laterally spaced locking plates to permit rotation of the rewind operating lever beyond its second position.

* * * * *